(12) United States Patent
Bhow et al.

(10) Patent No.: US 8,243,949 B2
(45) Date of Patent: Aug. 14, 2012

(54) NETWORK ADDRESSIBLE LOUDSPEAKER AND AUDIO PLAY

(75) Inventors: Gunjan Bhow, Menlo Park, CA (US); John Hart, Saratoga, CA (US)

(73) Assignee: Plantronics, Inc., Santa Cruz, CA (US)

( * ) Notice: Subject to any disclaimer, the term of this patent is extended or adjusted under 35 U.S.C. 154(b) by 489 days.

(21) Appl. No.: 12/423,232

(22) Filed: Apr. 14, 2009

(65) Prior Publication Data
US 2010/0260348 A1   Oct. 14, 2010

(51) Int. Cl.
*H04B 3/00* (2006.01)
(52) U.S. Cl. ............... 381/81; 381/80; 381/85; 381/77; 709/217; 709/219
(58) Field of Classification Search .......... 381/81, 381/80, 85, 77; 709/217, 219; 707/1, 10
See application file for complete search history.

(56) References Cited

U.S. PATENT DOCUMENTS

| | | | | |
|---|---|---|---|---|
| 5,867,223 A * | 2/1999 | Schindler et al. | ............. | 348/552 |
| 6,587,127 B1 * | 7/2003 | Leeke et al. | ............. | 715/765 |
| 7,325,043 B1 * | 1/2008 | Rosenberg et al. | ............. | 709/219 |
| 8,041,438 B2 * | 10/2011 | Batson et al. | ............. | 700/94 |
| 2002/0174187 A1 | 11/2002 | Kollar et al. | | |
| 2005/0131558 A1 * | 6/2005 | Braithwaite et al. | ............. | 700/94 |
| 2007/0214492 A1 * | 9/2007 | Gopi et al. | ............. | 726/2 |
| 2009/0063659 A1 * | 3/2009 | Kazerouni et al. | ............. | 709/219 |
| 2009/0245756 A1 * | 10/2009 | Cirrincione et al. | ............. | 386/124 |

FOREIGN PATENT DOCUMENTS

| | | |
|---|---|---|
| DE | 10310746 A1 | 12/2004 |
| EP | 1204239 A2 | 5/2002 |

OTHER PUBLICATIONS

Machine translation of DE1204239.

* cited by examiner

*Primary Examiner* — Thinh T Nguyen
(74) *Attorney, Agent, or Firm* — Chuang Intellectual Property Law (57) ABSTRACT

Methods and systems for network addressable loudspeakers and audio play are presented. One or more network addressable loudspeakers are registered at a server. An end user selects a network addressable loudspeaker to output audio, and an audio file is streamed from an audio source to the selected network addressable loudspeaker.

9 Claims, 13 Drawing Sheets

Claiming Your New Speakers

You have selected the following unclaimed loudspeaker:

Loudspeaker A

Enter the password for this loudspeaker

```
┌─────────────────────────────────────────────────┐
│                                                 │
│      Add loudspeaker to user profile as guest user │
│                                                 │
│                                                 │
│   Enter the name or identification code of the loudspeaker │
│                                                 │
│   ┌─────────────────────────────────────────┐   │
│   │ Hotel1240                               │   │
│   └─────────────────────────────────────────┘   │
│                                          ╲702   │
│                                                 │
│   Enter the password for this loudspeaker provided to you │
│                                                 │
│   ┌─────────────────────────────────────────┐   │
│   │ W487DE442                               │   │
│   └─────────────────────────────────────────┘   │
│                                          ╲704   │
│                                                 │
└─────────────────────────────────────────────────┘
```

NETWORK ADDRESSABLE LOUDSPEAKER AND AUDIO PLAY

BACKGROUND OF THE INVENTION

In recent years, end users of multimedia content including music or video have begun to utilize a variety of electronic devices to listen to listen to the audio and view the video content. Furthermore, the available format by which the multimedia content may be acquired and stored has increased. For example, in addition to storage on compact disks (CDs) or digital video disks (DVDs), audio and video content may also be stored in digital files in memory at various electronic devices. Such electronic devices may include, but are not limited to, web servers, desktop computers, laptop computers, and portable multimedia electronic devices such as smartphones and digital audio/video players.

In addition, delivery of multimedia content to end users via communication networks such as the Internet has increased in popularity. For example, end users may purchase and download digital music or video from commercial websites such as Apple iTunes. Multimedia content may also be streamed to the end user whereby the user may listen to or view the streamed audio/video on his device as the audio or video residing on a remote device is being streamed. For example, an end user may listen to music on his device streamed from an Internet radio station.

As the types of devices used to listen to, view, organize, and store multimedia content increases, and the delivery of multimedia content across communication networks increases, improved methods and systems for listening to multimedia content are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for loudspeakers, selection of loudspeakers, and audio play are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In the prior art, end users of multimedia content using a portable device such as a smartphone, portable music player, or laptop computer are limited to using the loudspeakers on the portable device when listening to or viewing multimedia content. By tying the loudspeakers to either the source of the multimedia content or to the control device being used to access, select, and control playback of the multimedia content, the end user is limited to the quality of the loudspeakers at the control device, which may be of limited quality depending upon the control device.

In one example, a user-selectable network addressable loudspeaker is provided that is decoupled from either the audio source or the user control device. In a further example, a user-selectable network addressable loudspeaker is provided that is decoupled from both the audio source and the user control device. The network addressable loudspeaker, audio source, and user control device may be decoupled across the Internet. In one example described herein, a software and hardware system to play personalized audio sources from the Internet or home personal computer to any desired selected loudspeaker using a mobile phone or web browser enabled device. Although the singular term "loudspeaker" may be used herein, such reference also applies to multiple speakers, each of which may be outputting a channel of a multi-channel audio performance, for example a pair of stereo loudspeakers used to output the left and right channels of a stereo audio signal. Similarly, the term "stream" is used herein in a generic manner to denote the transmission of audio data for subsequent reproduction, and is not limited to continuous, "real time" transmission and reproduction of audio data.

The methods and systems described herein provide end users with an improved audio listening experience and listening flexibility. By providing decoupled, network addressable loudspeakers, end users are now able to listen to their cloud-centric music and other audio/video using the network addressable loudspeakers, which may be designed to be of higher quality or audiophile quality relative to the loudspeakers on their portable computer or other portable audio/visual device.

In one example, where decoupled from both the control device and audio source, the loudspeakers are self-contained units not containing unnecessary components such as a display, keyboard, or other similar user interface. As such, where an owner such as a hotel operator wishes to provide high quality loudspeakers in every room, the owner may provide the loudspeakers without the need to purchase additional components associated with a computer, control device, or audio source.

In one use scenario, when a newly purchased network addressable loudspeaker (also referred to herein simply as a "loudspeaker" or "speaker") is first powered-on and connected to the Internet, a self-registration process is executed by the loudspeaker whereby the loudspeaker connects to a web server and transmits identification information. The owner or user of the loudspeaker logs onto a web application residing on the web server and adds the loudspeaker to his or her profile. A password and assign name may also be associated with the added loudspeaker.

During the audio play process, a user logs on to the web server and chooses which source of audio to play. After choosing the audio source, the user selects which loudspeaker to send the audio to. This may be accomplished, for example, using a browser on a PC, a dedicated PC or Mac application, a browser on a mobile phone, SMS message, or a dedicated application on a mobile phone. For loudspeakers on their profile or previously used speakers, a displayed list of selectable loudspeakers is already populated with the loudspeaker names. The web server also shows the "status" of each speaker, e.g., whether it is turned off, available, or busy playing other audio. Once the user selects the loudspeaker, the web server instructs the loudspeakers to connect to the audio source or to the web server and then the audio starts streaming to the selected loudspeakers.

For new loudspeakers which the user would like to use as a guest (such as in a hotel, at a friend's place, or a coffee shop), the guest user is provided the name of the speakers by the host or the facility, and the associated optional password. For example, a user staying at a particular hotel in room 3015 may select to use the speakers in the room, which could be named "HotelSF3015". The speaker names may be globally unique to avoid conflicts, or could be only proximity-based to create a LAN-type setup where only local uniqueness is necessary. Alternatively, a subdomain type setup could facilitate this. During playback, a user can log into the web server service and change the selected output loudspeakers.

In order to prevent a user from playing audio on a loudspeaker the user is not authorized for or not in close proximity to, a variety of security techniques may be implemented. In one example, the speakers must be approved by the "owner" from the web server or a mobile application. To further control the permission, the owner can indicate the duration of any approval. In addition to password protection similar to that of a wireless LAN, proximity detection can provide another layer of policy control on this issue. Speakers can be selected for playback only upon verification of the same LAN gateway (i.e., speakers and the control device need to be in the same subnet). While this does not address a multi-tenant situation arising in a hotel or a pre-wired apartment building, it dramatically reduces the possibilities of conflict without sacrificing usability. In a further example, the speakers can utilize the Bluetooth ID of the control device to ensure proximity.

In one example, a system for audio play includes a server, a network addressable loudspeaker, an audio source storing one or more audio files, and a control device. The network addressable loudspeaker includes an audio output transducer, a network interface, a processor, and a computer readable memory storing instructions which when executed by the processor cause the network addressable loudspeaker to register with the server, receive an audio signal via the network interface, and output the audio signal through the audio output transducer. The control device is operable to communicate with the server and select the network addressable loudspeaker from a plurality of network addressable loudspeakers to receive a streaming audio file from the audio source.

In one example, a computer readable storage medium stores instructions that when executed by a computer cause the computer to perform a method for managing audio play. The method performed includes receiving a plurality of registrations from a plurality of network addressable loudspeakers, associating one or more selectable network addressable loudspeakers with a user profile, and associating one or more selectable audio sources with the user profile. The method further includes receiving a first user selection from a user associated with the user profile, the first user selection comprising a selected audio source, and receiving a second user selection from the user associated with the user profile, second user selection comprising a selected network addressable loudspeaker. The method further includes initiating streaming of an audio file from the selected audio source to the selected network addressable speaker.

In one example, a network addressable loudspeaker includes a network interface, an amplifier, an audio output transducer, a processor, and a computer readable memory. The computer readable memory stores instructions which when executed by the processor cause the network addressable loudspeaker to register with a remote server, receive an audio signal via the network interface, and output the audio signal through the audio output transducer. The network addressable loudspeaker further includes a housing enclosure. The housing enclosure includes an access port for the audio output transducer, wherein the amplifier, processor, and computer readable memory are disposed within the housing enclosure. Where the network interface is a wired interface, the housing enclosure also includes an access opening for the network interface.

Figure 1:
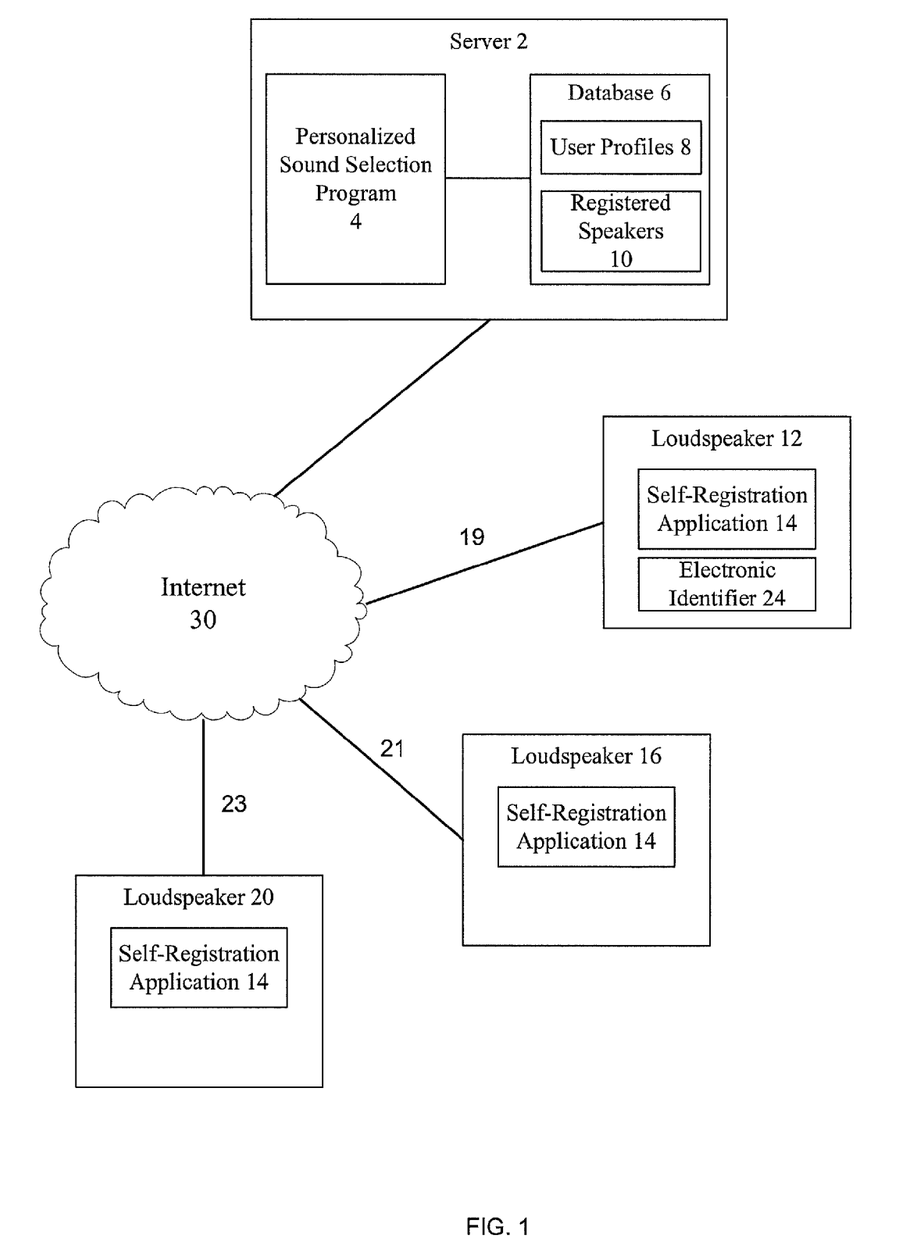
FIG. 1 illustrates a system for self registration of network addressable loudspeakers.

FIG. 1 illustrates a system for self registration of network addressable loudspeakers. Referring to FIG. 1, a server 2 executing software capable of performing functions described herein is coupled to the Internet 30. Server 2 includes a personalized sound selection program 4 in communication with a database 6. The database 6 includes user profiles 8 and registered speakers 10. A loudspeaker 12 capable of connection to the Internet 30 via a communication link 19 includes a self registration application 14. A loudspeaker 16 capable of connection to the Internet 30 via a communication link 21 includes a self registration application 14. A loudspeaker 20 capable of connection to the Internet 30 via a communication link 23 includes a self registration application 14. Although FIG. 1 only shows three loudspeakers in communication with server 2 via Internet 30, in operation any number of loudspeakers having self registration modules 14 may be in use. Communication links 19, 21, 23 may be either wired or wireless links to the Internet 30. In one example, a loudspeaker may include a unique electronic identifier. For example, as shown in FIG. 1, loudspeaker 12 includes an electronic identifier 24.

In operation, during the self registration process each loudspeaker 12, 16, 20 upon connection to the Internet 30 automatically sends identification information to server 2 to indicate its presence and availability. Loudspeakers 12, 16, and 20 access Internet 30 utilizing a LAN router. For example, a speaker may identify itself by sending an IP address or a unique electronic identifier such as a globally unique electronic serial number. In one example, the loudspeaker registers itself using its media access control (MAC) address. Registered speakers 10 in database 6 include all loudspeakers which have self registered with the server 2. Each registered loudspeaker 12, 16, 20 is an Internet addressable device following self registration. In one example, loudspeakers 12, 16, 20 are stand alone independent speakers without a keyboard or display user interface. Once registered, each loudspeaker may receive commands and other messages from server 2, operating as a client addressable over the Internet.

Figure 4A:
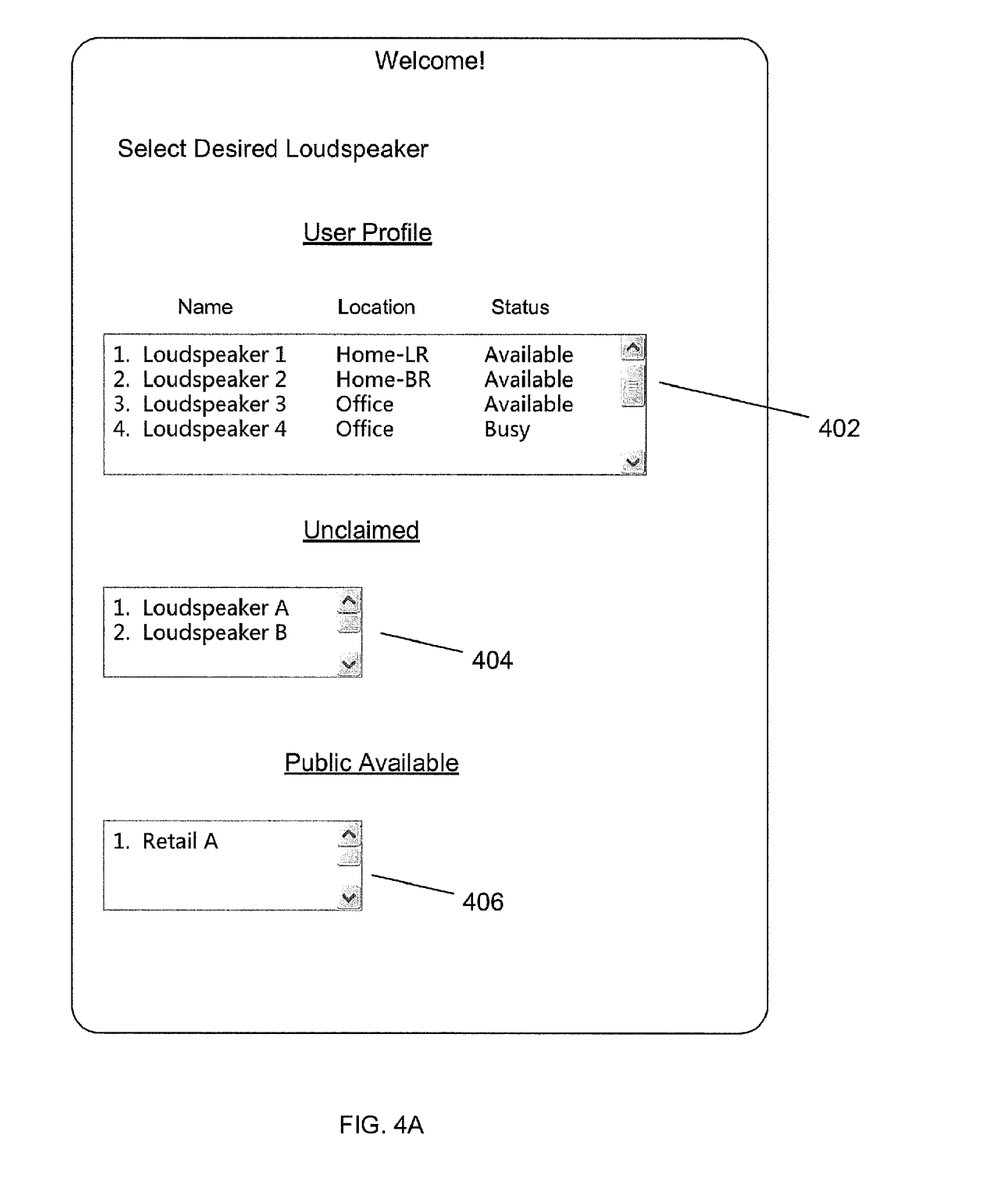
FIGS. 4A and 4B illustrate web pages where a user identifies a network addressable loudspeaker to add to his user profile.
Figure 4B:
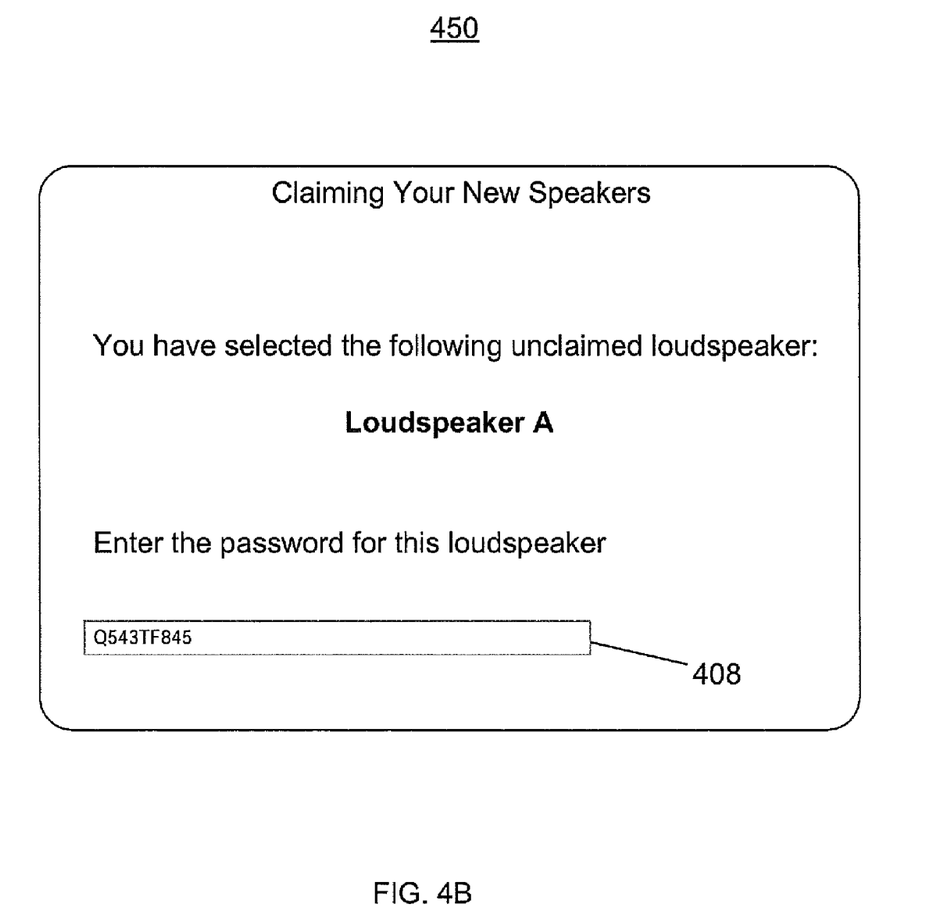

In further operation, following self registration, each loudspeaker is claimed by a loudspeaker owner for use by the owner and added to the owner's user profile in user profiles 8, as discussed in a further detail with reference to FIG. 4. The loudspeaker owner may also allow guest users access to such a claimed loudspeaker, as discussed in further detail below with reference to FIG. 7. During the audio play process, the user may select from any of the registered loudspeakers associated with his or her user profile.

Figure 2:
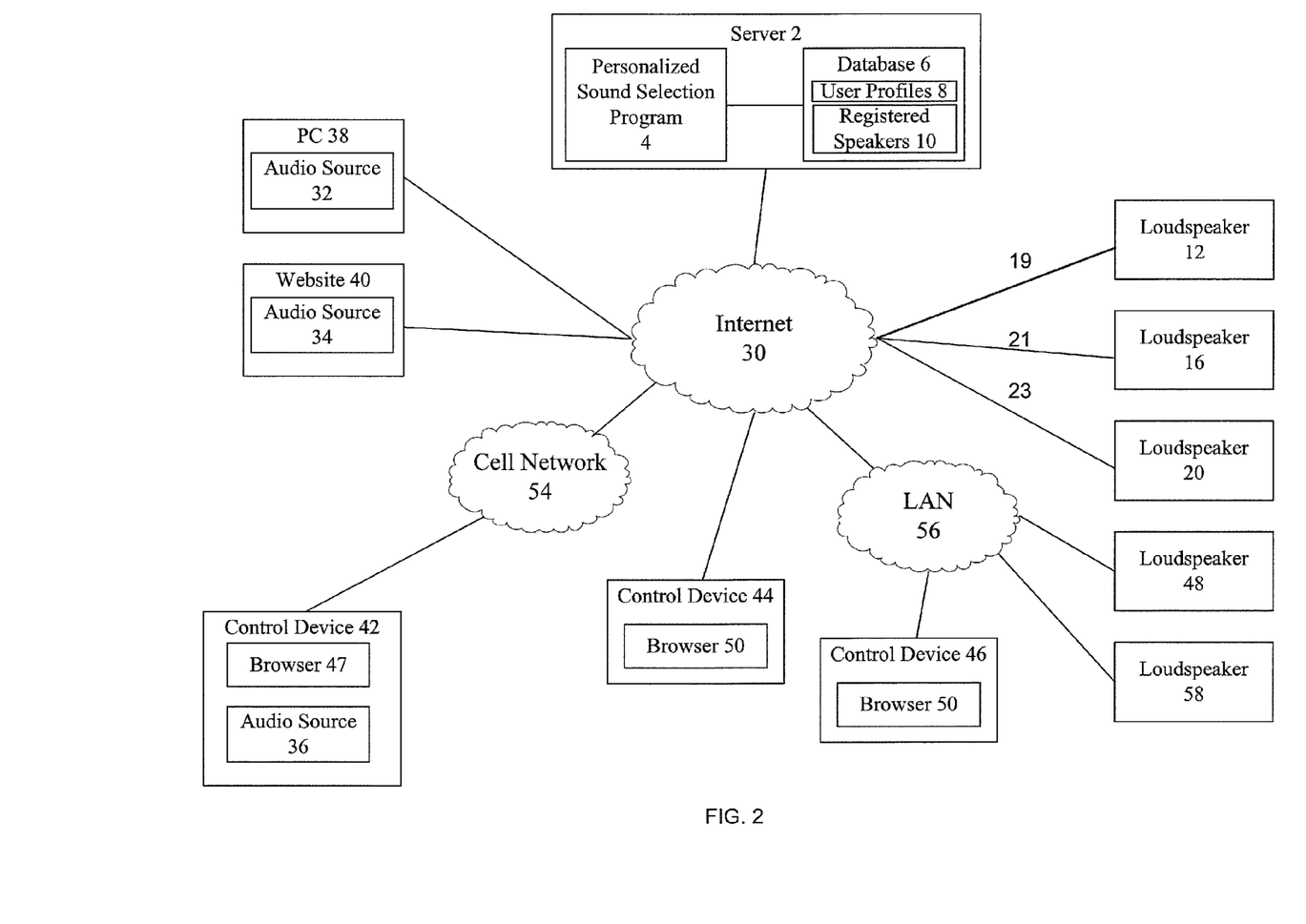
FIG. 2 illustrates a system for audio play.

FIG. 2 illustrates a system for audio play. The system includes at least one registered Internet addressable loudspeaker, at least one audio source storing one or more audio files, and at least one control device connectable to server 2. An audio source may be located at a variety of devices coupled to the Internet 30, and is any source addressable on the web in one example. Thus, the audio source may be remote from the user's current location and control device.

The control device is operable to communicate with the server and select the network addressable loudspeaker from a plurality of network addressable loudspeakers to receive a streaming audio file from the audio source. The control device may be any device executing an application capable of communication with server 2. For example, the control device may be a mobile phone, portable computer, or desktop PC executing a micro web browser or web browser.

In one sample configuration shown in FIG. 2, an audio source 32, a control device 44, and a network addressable loudspeaker 12 are decoupled from one another and distributed at different network addresses within a communications network. In a further sample configuration, a network addressable loudspeaker 12 is decoupled from an audio source 36 at a control device 42 at a different network address within a communications network.

Referring to FIG. 2, an audio source 32 is located at a personal computer 38. For example, personal computer 38 may be at a user's home or office. In one example, audio source 32 is the user's library of digital music files. An audio source 34 is located at a website 40. In one example, audio source 34 is an Internet radio station or web based music subscription service.

A control device in communication with server 2 via the Internet 30 is used during the audio play process, whereby the audio play process may include selecting an audio source and selecting a network addressable loudspeaker. In one example, a control device 42 connects to the Internet 30 and server 2 via a cellular network 54. For example, control device 42 may be a cellular telephone or smartphone. Control device 42 includes a micro web browser 47 for interaction with server 2. An audio source may also be located at a control device. For example, control device 42 includes an audio source 36.

In a further example, a control device 44, such as a notebook or desktop computer connects to the server 2 via the Internet 30. Control device 44 includes a web browser 50 for interaction with server 2. In FIG. 2, loudspeakers 12, 16, 20, 48, and 58 have been registered at server 2 and are available in registered speakers 10 as described above in reference to FIG. 1. Server 2 includes a personalized sound selection program 4 utilizing database 6.

In one example, a control device 46, loudspeaker 48, and loudspeaker 58 connect to Internet 30 via a local area network (LAN) 56, thereby having a matching LAN gateway and having the same public IP address, though control device 46, loudspeaker 48, and loudspeaker 58 have different local IP addresses.

In operation, during the audio play process a user logs onto his account on server 2 using the personalized sound selection program 4. The personalized sound selection program 4 accesses the user's profile from database 6 and displays a list of audio sources the user may select from and a list of registered loudspeakers the user may select from. Depending upon the audio source, such as if the audio source is at a remote home PC, the home PC must be powered on to be selected. In a further example the user need only select the desired registered loudspeaker.

Once the audio source and registered loudspeaker are selected, the personalized sound selection program 4 initiates streaming of the selected audio source to the selected registered loudspeaker upon user command. Streaming between the selected audio source and the selected registered loudspeaker may be performed in a peer-to-peer implementation. Playback control of audio from the audio source is performed at the control device using an appropriate user interface.

Referring again to FIG. 2, in one example a website 40 includes an audio source 34. For example, website 40 is any website capable of streaming audio source 34 to a selected client device. In operation, upon selection of website 40 as the desired source by the user, server 2 interacts with website 40 and instructs website 40 to stream audio source 34 to the user selected network addressable loudspeaker 12, 16, 20, 48 or 58 rather than to the user control device or server 2.

In another example illustrated in FIG. 2, a personal computer 38 includes an audio source 32. Utilizing a control device 42, 44, or 46, a user may browse lists of audio files in audio source 32 and select a desired music for playback. The lists of audio files on audio source 32 are viewed at a web application operating on server 2, whereby the web application has been synchronized with personal computer 38 to contain the metadata of the audio files in audio source 32. In operation, upon receiving user playback commands from control device 42, 44, or 46, server 2 interacts with personal computer 38 to stream the selected audio file to the user selected network addressable loudspeaker 12, 16, 20, 48, or 58.

In a further example illustrated in FIG. 2, an audio source 36 is stored on control device 42. During the play process, upon selection of audio source 32 at a control device 42, the user may browse the audio files contained an audio source 32 using any suitable application residing either on control device 42 or server 2. In operation, upon receiving user playback commands from control device 42, server 2 interacts with control device 42 to stream the selected audio file to the user selected network addressable loudspeaker 12, 16, 20, 48, or 58.

The list of network addressable loudspeakers which the user may select from may also include registered loudspeakers for which the user has not previously claimed to his user account. For example, if the user is in a hotel room or at a friend's house, registered loudspeakers at those locations may also appear on the speaker list. These loudspeakers can be either private loudspeakers in a private residence, or public speakers in a public location or place of business. If the user selects one of these private or public speakers, he may be prompted to enter a password prior to use.

In a further example, the list of network addressable loudspeakers which the user may select from may be limited to only loudspeakers identified as having a matching LAN to the currently used control device. In this example, referring to FIG. 2, a user at control device 46 is limited to selecting either network addressable loudspeaker 48 or network addressable loudspeaker 58 within the same LAN 56. In this manner, a measure of proximity between the control device 46 and selectable loudspeakers is provided to assure appropriate speaker selection and use.

Figure 3:
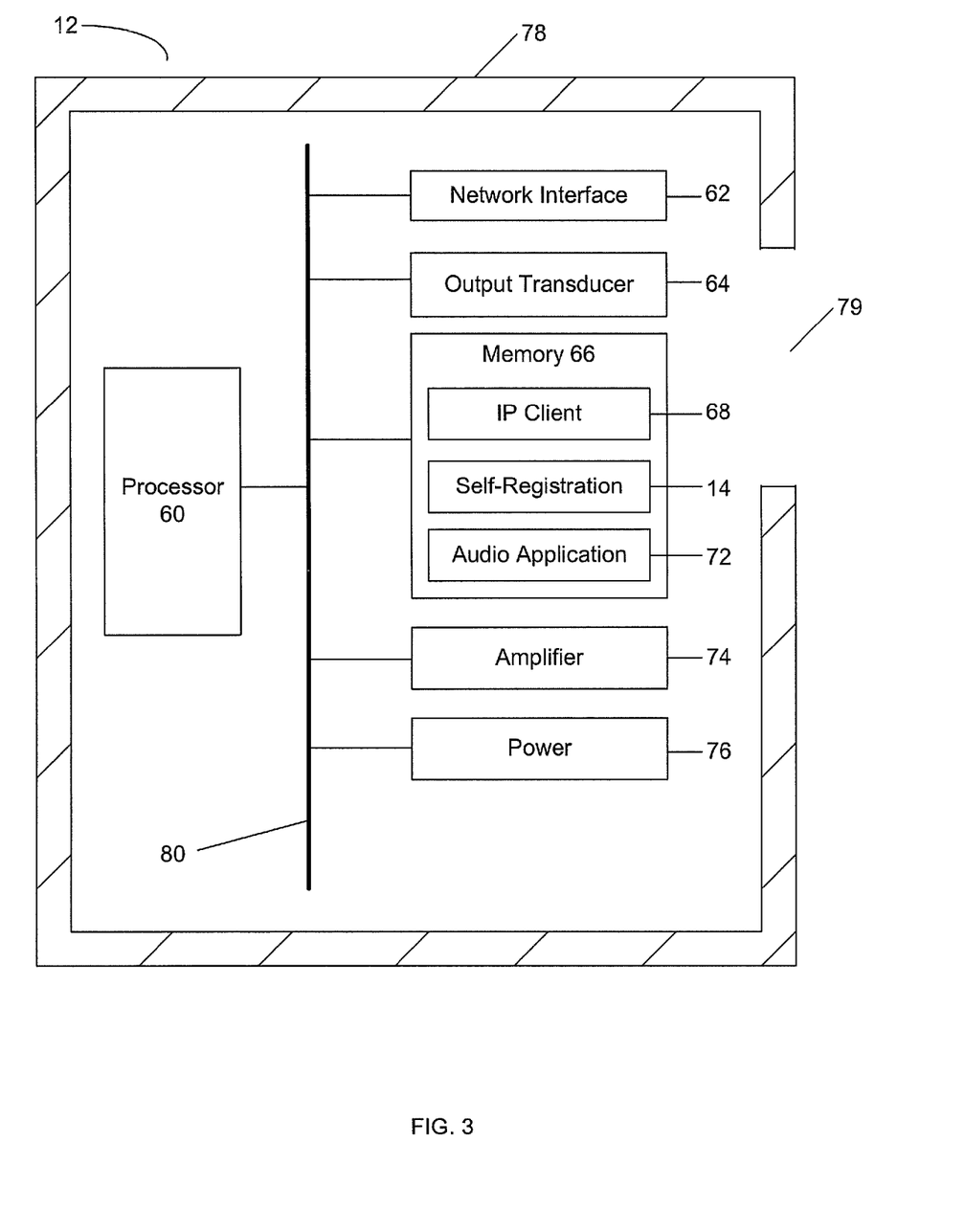
FIG. 3 illustrates a network addressable loudspeaker in one example.

FIG. 3 illustrates a simplified diagram of a network addressable loudspeaker 12 in one example. Configurations for loudspeakers 16, 20, 48, and 58 are similar. Network addressable loudspeaker 12 includes a processor 60 operably coupled via a bus 80 to a network interface 62, output transducer 64, memory 66, amplifier 74, and power source 76. In one example, network addressable loudspeaker 12 also includes an additional near-field wireless interface, such as a Bluetooth transceiver, utilized as described below in reference to FIG. 9 and FIG. 12 to link with a control device or wearable device.

In one example, the network interface 62 is a wireless transceiver and accompanying antenna for communications with a wireless router or access point. For example, the wireless transceiver is a Bluetooth or 802.11 transceiver. In a further example, network interface 62 is a wired interface, such as that an Ethernet jack used to connect to server 2 over the Internet or a local area network. Processor 60 allows for processing data, including managing registration information and streamed audio over network interface 62. Processor 60 may include a variety of processors (e.g., digital signal processors), with conventional CPUs being applicable.

Memory 66 may include a variety of memories, and in one example includes RAM, ROM, flash memory, or a combination thereof. Memory 66 may further include separate memory structures or a single integrated memory structure. Memory 66 stores an IP client application 68 executed by processor 60 for client/server communications with server 2. Memory 66 also stores a self-registration application 14 executed by processor 60 to register loudspeaker 12 at server 2. Memory 66 also includes an audio application 72 executed by processor 60 to receive streamed digital audio over the network interface 62 and output the audio through output transducer 64.

The network addressable loudspeaker 12 further includes a housing enclosure 78. The housing enclosure 78 may include an access opening for the network interface 62 where network interface is a wired interface, and an access opening 79 (also referred to herein as a port) for the audio output transducer 64. The amplifier 74, processor 60, network interface 62, output transducer 64, and memory 66 are disposed within the housing enclosure 78.

In one example, the network addressable loudspeaker 12 has a unique electronic identifier 24 used for addressing network addressable loudspeaker 12 on Internet 30. For example, the electronic identifier 24 used for addressing the network addressable loudspeaker 12 is a Media Access Control (MAC) address. Where loudspeaker 12 includes an electronic identifier 24, in one example the electronic identifier 24 is stored in memory 66 or at network interface 62.

FIGS. 4A and 4B illustrate web pages where a user identifies a network addressable loudspeaker to add (also referred to herein as "claim") to his user profile. Referring to FIG. 4A, a web page 400 is displayed to the user following user login. In one example, user login to server 2 is performed utilizing a conventional name and password entry system. Web page 400 includes a list 402 of previously claimed speakers associated with the user's profile, a list 404 of registered, but unclaimed loudspeakers, and a list 406 of nearby public loudspeakers available for free association. List 404 includes all unclaimed loudspeakers that have previously been registered and are currently located on the same LAN as the user control device.

In this manner, by including only unclaimed loudspeakers on the same LAN, the user is advantageously presented with a limited subset of unclaimed speakers which are likely to be the user's desired speaker. Furthermore, security is enhanced in preventing the user from claiming speakers owned by others.

Upon selection by the user of a loudspeaker appearing in list 404, a web page 450 illustrated in FIG. 4B is sent to the user from server 2. Web page 450 includes an input field 408 where the user enters the password associated with the desired registered speaker he would like to claim to his user profile.

Figure 5:
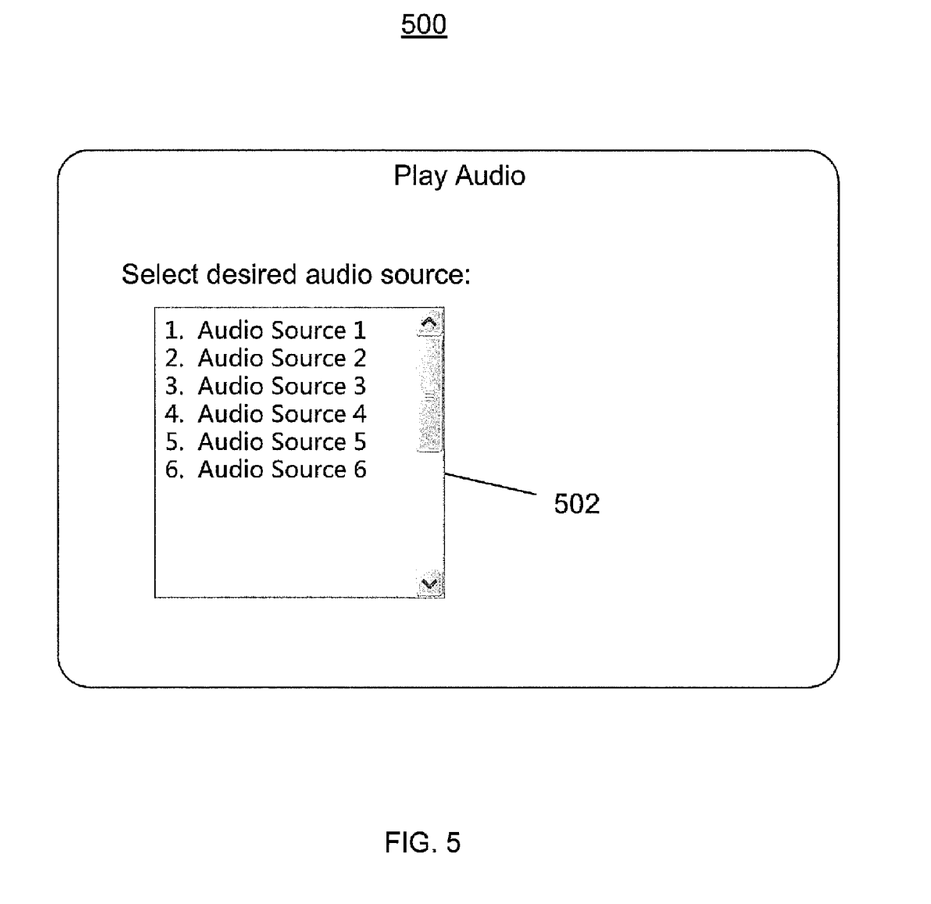
FIG. 5 illustrates a web page where a user selects an audio source for audio play.

During the audio play process, a user accesses his user profile from server 2, and selects an audio source and selects a desired output loudspeaker. FIG. 5 illustrates a web page 500 where a user selects an audio source for audio play during the audio play process. Web page 500 is received from personalized sound selection program 4 at server 2 and displayed at a user control device, and includes a list 502 of audio sources which the user would like to select audio files to play. In one example, each audio source in list 502 may also include a status indicating whether the audio source is currently available for selection. For example, where the audio source is located at a personal computer that is currently powered down, the audio source may be identified as unavailable. Audio sources appearing list 502 may be added by the user via personalized sound selection program 4.

As used herein, the term "audio source" also encompasses video having corresponding audio. For example, selecting an audio source file may include selecting a video file to view, whereby the audio content corresponding to the video is streamed to the selected network addressable loudspeaker and the video content is displayed on the user control device or other selected display device. The display device may itself be network addressable and selected in a manner similar to selection of the audio source and loudspeaker.

Figure 6:
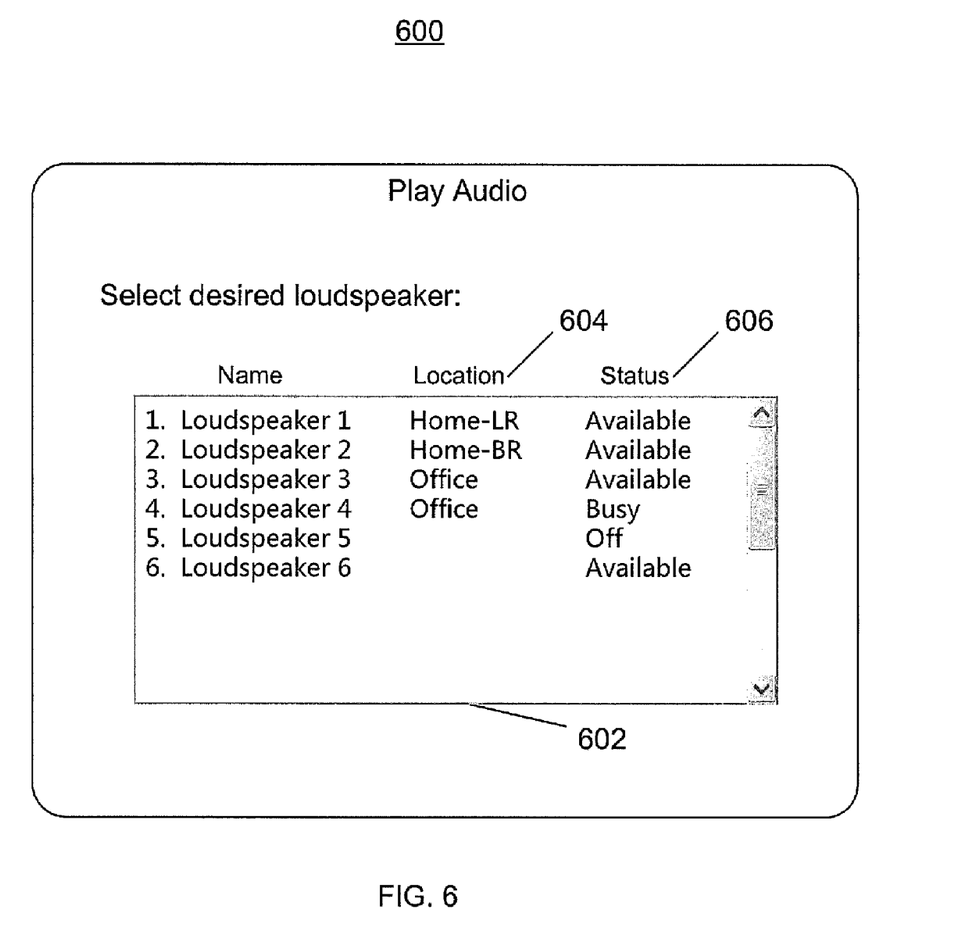
FIG. 6 illustrates a web page where a user selects a network addressable loudspeaker for audio play.

FIG. 6 illustrates a web page 600 where a user selects a network addressable speaker for audio play. Web page 600 is received from personalized sound selection program 4 at server 2 and displayed at a user control device, and includes a list 602 of claimed registered speakers which the user would like to output the audio from the audio source selected at web page 500. In the example shown in web page 600, each loudspeaker in list 602 may include a location descriptor 604 previously entered by the user, and a status descriptor 606 indicating whether the loudspeaker is currently available for selection. For example, status descriptor 606 may identify a loudspeaker as available, busy, or off. One of ordinary skill in the art will recognize that other status descriptors may be used in further examples. The loudspeaker name may be previously assigned and correlated to a unique identification code by the user during the claiming process.

Figure 7:
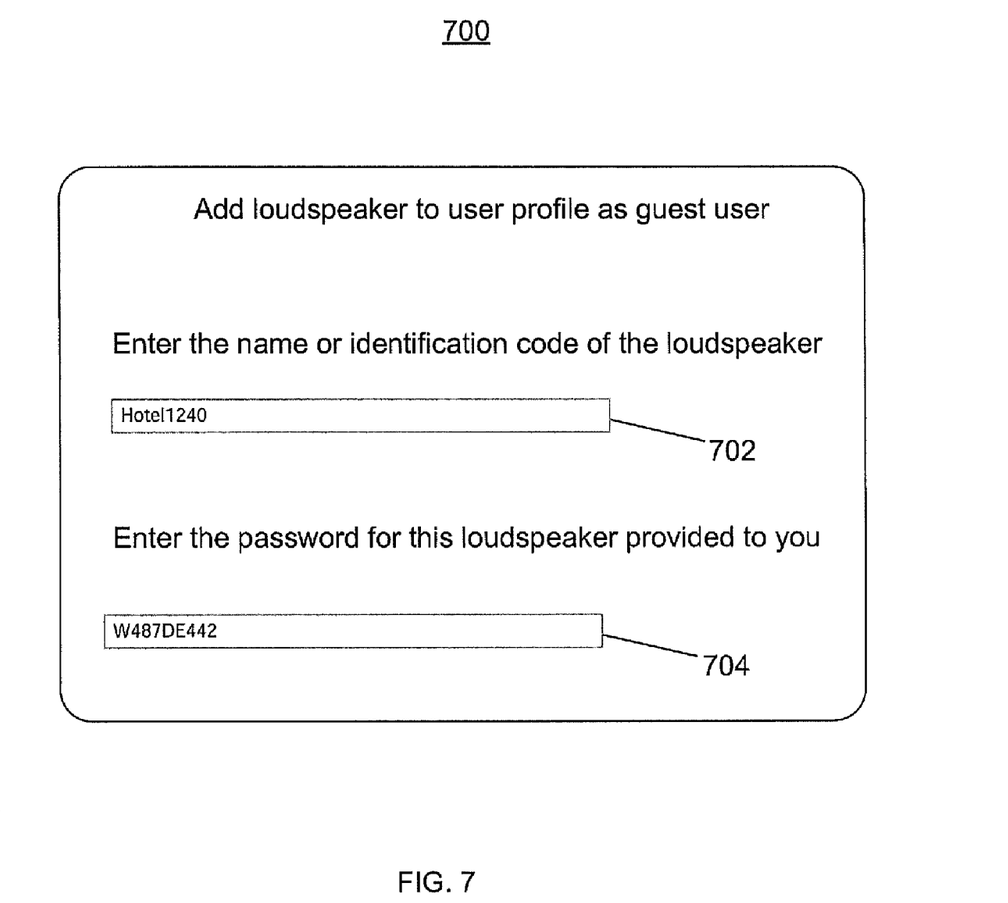
FIG. 7 illustrates the web page where a user identifies a temporary network addressable loudspeaker to add to his user profile as a guest user.

FIG. 7 illustrates the web page 700 where a user identifies a guest network addressable loudspeaker to add to his user profile as a guest user. Web page 700 is received from server 2 and displayed at a user control device, and includes a user input field 702 where the user enters the name or identification code of the registered speaker which the user would like to add to his or her user profile as a guest user. Web page 700 also includes a user input field 704 where the user enters the password associated with the desired loudspeaker. For example, the desired loudspeaker may be a private or public loudspeaker as described above. The password is provided to the user by the owner of the private or public loudspeaker. At server 2, the personalized sound selection program 4 identifies whether the password entered by the user matches a previously stored password associated with the entered loudspeaker name or identification code. If there is a match, the loudspeaker name or identification code is added to the user profile list of selectable loudspeakers.

The owner of a registered loudspeaker may set various usage policies for guest users. For example, the owner may allow his registered loudspeaker to be selected for output only if the control device has the same matching public IP address as his registered loudspeaker. For example, where the owner is a hotel with registered loudspeaker in each guest room, a guest user with the correct speaker identification code and password may select a hotel registered loudspeaker only if the guest users control device has the same public IP address as the hotel loudspeakers. In this manner, only a user within the hotel can utilize the hotel loudspeakers. In a further example, the owner may set an expiration date and time for any guest loudspeaker added to a user profile. Upon reaching the expiration date, the guest loudspeaker is automatically deleted from the user profile.

Figure 8:
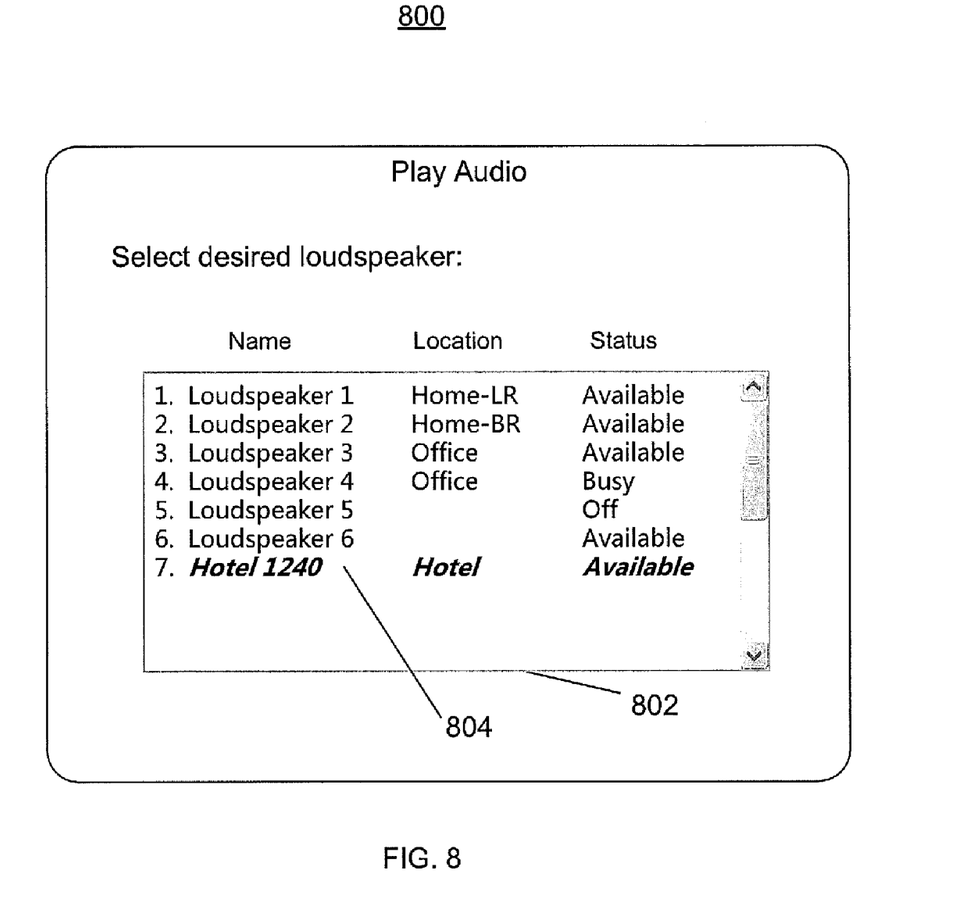
FIG. 8 illustrates a web page where a temporary network addressable loudspeaker has been added to a user profile.

FIG. 8 illustrates a web page 800 where a user selects a network addressable speaker for audio play. Web page 800 is received from personalized sound selection program 4 at server 2 and displayed at a user control device, and includes a list 802 of registered loudspeakers which the user may select from to output audio. In web page 800, a guest network addressable loudspeaker 804 has been added to a user profile. For example, the guest network addressable loudspeaker 804 may have been previously added using web page 700 described above in reference to FIG. 7. In one example, recently added loudspeakers to the user's profile or loudspeakers which the user has added as a guest user may appear in bold or otherwise highlighted text to assist the user in making a predicted desired selection.

Figure 9:
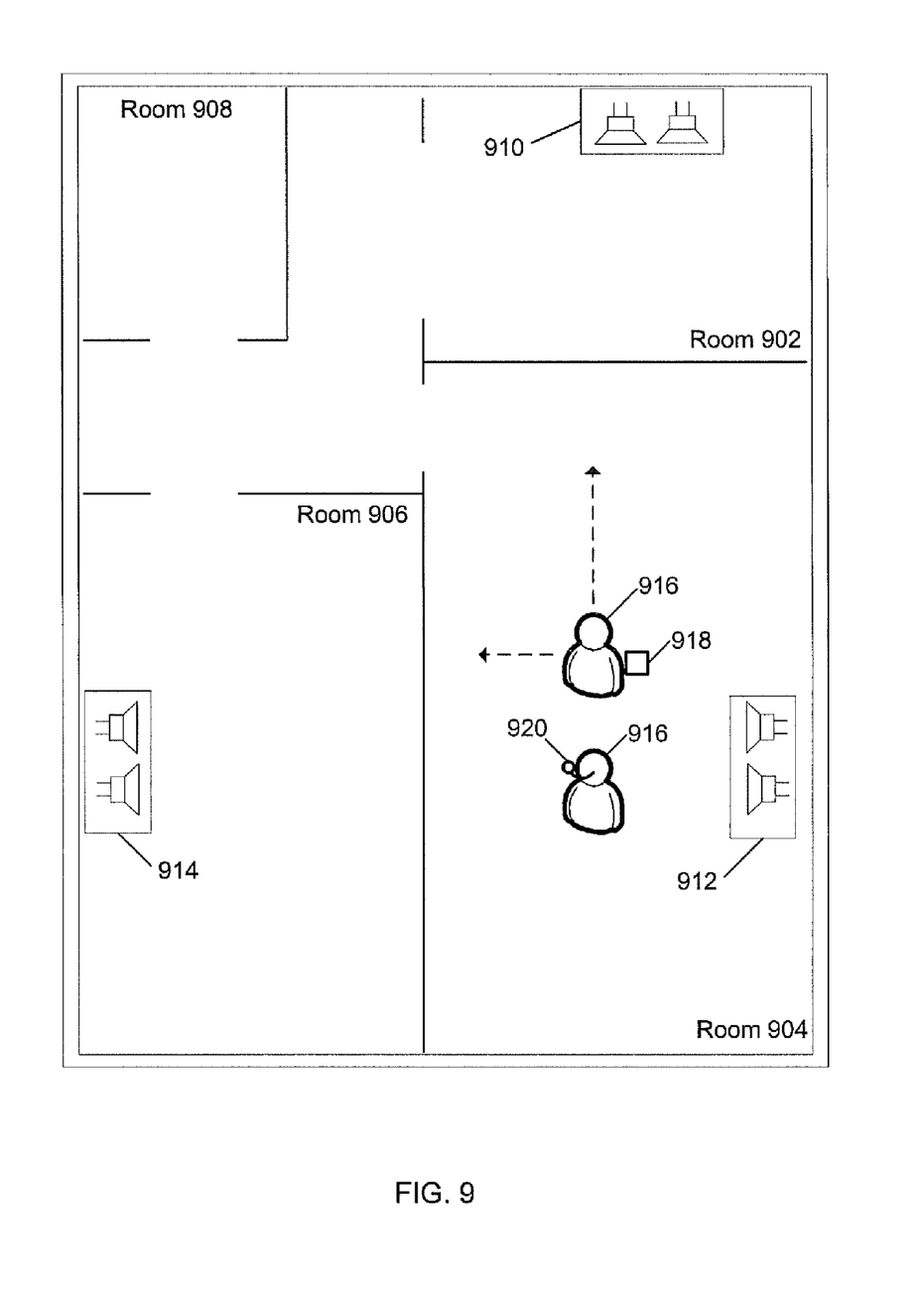
FIG. 9 illustrates automatic selection of a network addressable loudspeaker from several network addressable loudspeakers based on proximity.

FIG. 9 illustrates automatic selection of a network addressable loudspeaker from several network addressable loudspeakers located in a floor plan 900 based on proximity. Floor plan 900 includes a first room 902, a second room 904, a third room 906, and a fourth room 908. For example, where floor plan 900 corresponds to the home of a user 916, first room 902 may be the user's kitchen, second room 904 may be the user's living room, and third room 906 may be the user's bedroom. Located in first room 902 is a network addressable speaker 910. Located in second room 904 is a network addressable speaker 912. Located in third room 906 is a network addressable speaker 914. Network addressable speakers 910, 912, and 914 have been registered at server 2 and claimed by a user 916.

In the example illustrated in FIG. 9, rather than having a user select the desired loudspeaker as illustrated in FIG. 6, personalized sound selection program 4 automatically selects the output loudspeaker based on physical proximity of the user to a nearest loudspeaker. The user in his user profile at server 2 may indicate that the nearest available loudspeaker should be automatically selected as the default output loudspeaker. In one example, the automated selection is based on the proximity of a user control device 918 to loudspeakers 910, 912, and 914.

The proximity detection can be based on a Bluetooth link between the user control device 918, such as a mobile phone, and a Bluetooth enabled loudspeaker. The Bluetooth discovery protocol may be utilized to identify Bluetooth enabled Loudspeakers within range of user control device 918. Where the user control device 918 is within Bluetooth range of a Bluetooth enabled loudspeaker, the loudspeaker is automatically selected. As the user 916 with control device 918 moves between rooms 902, 904, and 906, the selected output loudspeaker is automatically switched to speaker 910, 912, and 914, respectively. Where the user control device 918 is within detectable wireless range of multiple loudspeakers 910, 912, and 914, proximity detection techniques such as received signal strength indication (RSSI) may be used to identify the nearest loudspeaker among several detected loudspeakers.

In a further example, a user 916 wearing a wearable device 920, such as a Bluetooth headset or Personal Authentication Link (PAL) device, may move within room 902, 904, and 906. More information on the PAL device can be found in U.S. patent application Ser. No. 12/277,226 entitled "Portable Network Device For The Discovery Of Nearby Devices And Services" filed on Nov. 24, 2008, the disclosure of which is incorporated by reference herein as if explicitly set forth. The automated selection is based on the proximity of the user wearable device 920 to loudspeakers 910, 912, and 914. A direct wireless link between a wearable device 920 and loudspeakers 910, 912, and 914 is utilized. The wearable device 920 is logged into the server 2 using a web browser on a control device such as a laptop computer, and the server 2 identifies the nearest proximity loudspeaker speaker. In this example, the proximity detection is through the wearable device 920 rather than the control device. In a further example, the wearable device 920 is a key FOB.

Figure 10:
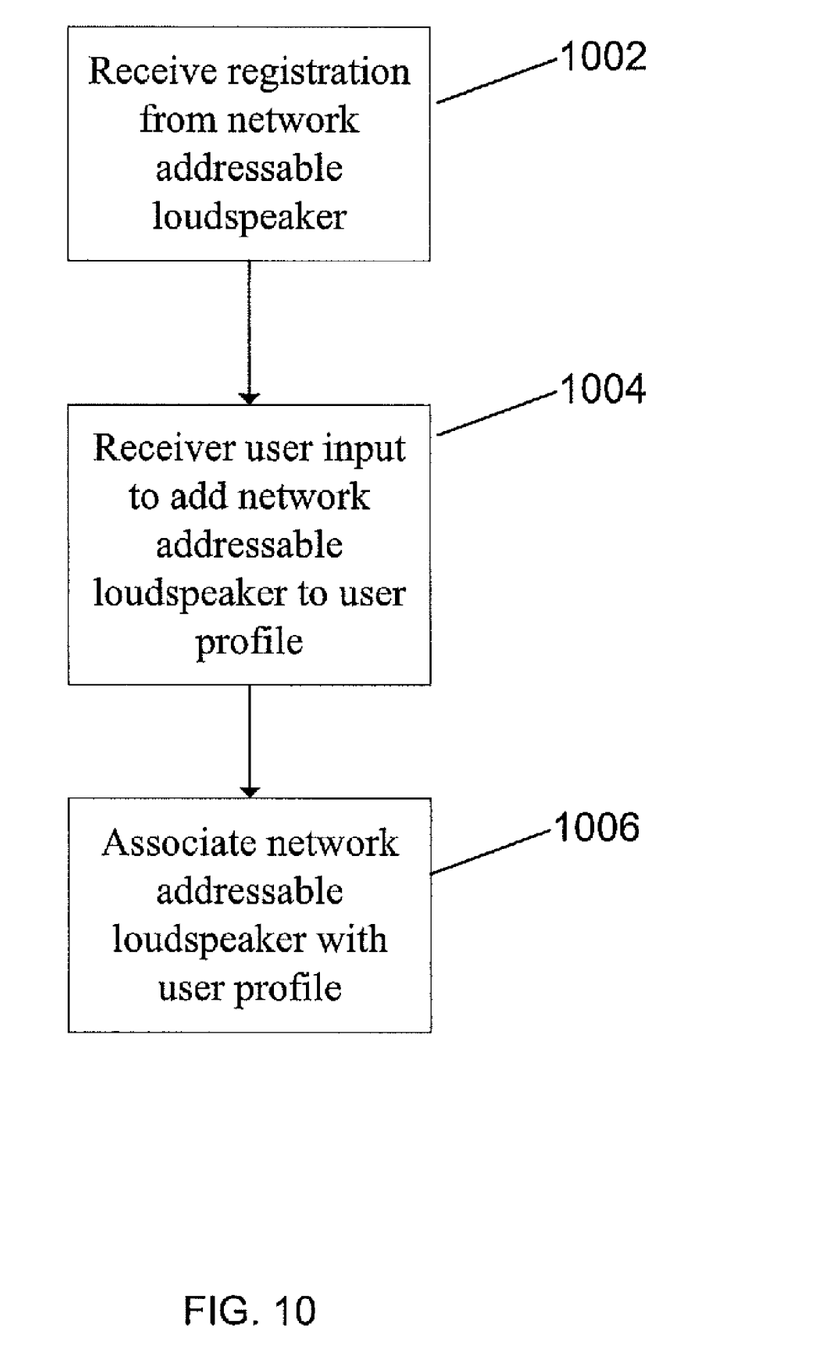
FIG. 10 is a flow diagram illustrating a self registration process for a network addressable loudspeaker.

FIG. 10 is a flow diagram illustrating a self registration and claiming process for a network addressable loudspeaker. At block 1002, a registration is received from a network addressable loudspeaker. This registration may include an IP address of the network addressable loudspeaker and/or a unique electronic identifier, such as a MAC address, associated with the network addressable loudspeaker. At block 1004, a user input is received to add the registered network addressable loudspeaker to the user's profile. At block 1006, the registered network addressable loudspeaker is associated with the user' profile.

In one example, receiving the user input at block 1004 includes receiving a loudspeaker identifier from the user, the loudspeaker identifier associated with a previously registered network addressable loudspeaker not listed on the user profile, and receiving a password associated with the loudspeaker identifier from the user. Prior to adding the loudspeaker identifier to the user profile of the user or automatically selecting the loudspeaker identifier, it is identified whether the password received from the user matches a previously stored password associated with the loudspeaker identifier. In a further example, the user input need only be a unique identification code.

Figure 11:
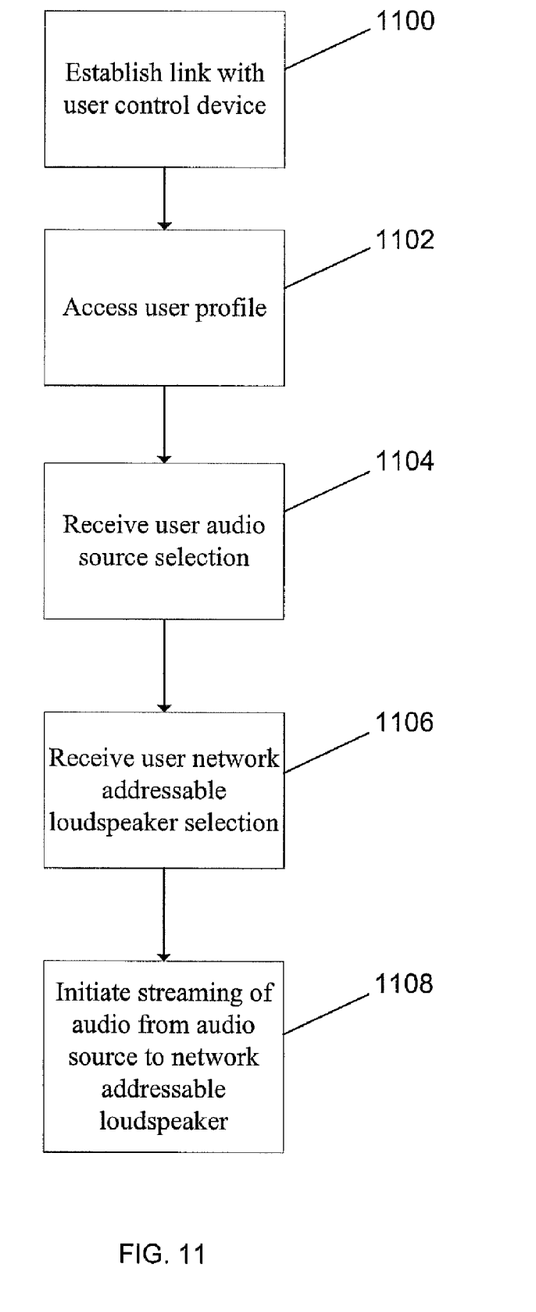
FIG. 11 is a flow diagram illustrating a process for audio play including audio source selection and loudspeaker selection.

FIG. 11 is a flow diagram illustrating an audio play process for audio selection and playback including audio source selection and loudspeaker selection. At block 1100, a communications link is established with a user control device. At block 1102, a user profile is accessed. At block 1104, a user selection comprising a selected audio source is received. At block 1106, a user selection comprising a selected network addressable loudspeaker is received. At block 1108, streaming of an audio file from the selected audio source to the selected network addressable speaker is initiated.

The process may also include receiving or identifying an availability status from each network addressable loudspeaker in the user's profile. The process may also include receiving or identifying an availability status from each audio source in the user's profile.

In one example, a close proximity is detected between the user control device and a network addressable loudspeaker. The close proximity may be detected based upon a matching LAN gateway or IP address, or based on physical proximity determination. Upon detecting the close proximity between the user control device and the network addressable loudspeaker, the network addressable loudspeaker is automatically selected and streaming of an audio file from the selected audio source to the network addressable speaker is initiated.

In a further example, when a user selection comprising a selected network addressable loudspeaker is received at block 1106, the selected network addressable loudspeaker is limited to one or more identified network addressable loudspeakers having a desired physical proximity to the user control device.

Figure 12:
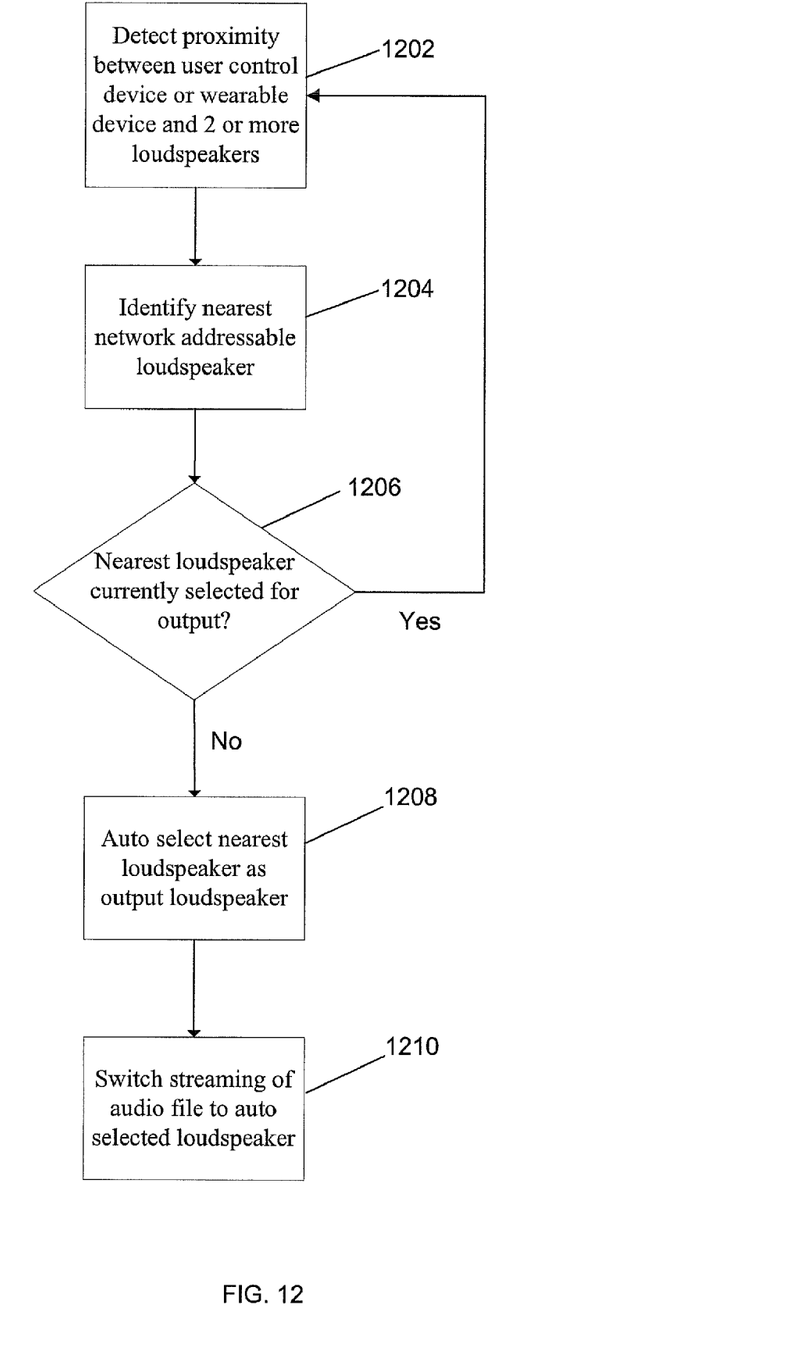
FIG. 12 is a flow diagram illustrating a process for proximity detection and switching for network addressable loudspeakers.

FIG. 12 is a flow diagram illustrating a process for proximity detection and switching for network addressable loudspeakers. At block 1202, a close proximity is detected between a control device or a wearable device and one or more local network addressable loudspeakers. At block 1204, the nearest network addressable loudspeaker is identified. At decision block 1206, it is determined whether the nearest network addressable loudspeaker is currently selected as the output loudspeaker. If Yes at decision block 1206, the process returns to block 1202. If No at decision block 1206, at block 1208 the nearest network addressable loudspeaker is automatically selected as the output loudspeaker. At block 1210, steaming of the audio file is switched to the automatically selected nearest network addressable loudspeaker from the selected audio source.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: the type of communication link between devices, either wired or wireless, the types of computing devices used as control devices, the types of computing devices storing audio sources, the specific method of addressing a network addressable loudspeaker, and the proximity detection techniques to identify a nearest loudspeaker. Furthermore, the functionality associated with any blocks described above may be centralized or distributed. It is also understood that one or more blocks of the system may be performed by hardware, firmware or software, or some combinations thereof. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A computer readable storage medium storing instructions that when executed by a computer cause the computer to perform a method for managing audio play comprising:
   receiving a plurality of registrations from a plurality of network addressable loudspeakers,
   associating one or more selectable network addressable loudspeakers with a user profile;
   associating one or more selectable audio sources with the user profile;
   receiving a first user selection from a user associated with the user profile, the first user selection comprising a selected audio source and wherein the first user selection is from a user control device
   receiving a second user selection from the user associated with the user profile, the second user selection comprising a selected network addressable loudspeaker; and
   initiating streaming of an audio file from the selected audio source to the selected network addressable loudspeaker, wherein the selected network addressable loudspeaker and user control device are addressable at different network addresses within a communications network.

2. The computer readable storage medium of claim 1, the method further comprising receiving or identifying an availability status from each network addressable loudspeaker in the plurality of network addressable loudspeakers.

3. The computer readable storage medium of claim 1, the method further comprising receiving or identifying an availability status from each audio source in the one or more selectable audio sources.

4. The computer readable storage medium of claim 1, the method further comprises detecting a close proximity between the user control device and a network addressable loudspeaker.

5. The computer readable storage medium of claim 4, wherein upon detecting the close proximity between the user control device and a network addressable loudspeaker, automatically selecting the network addressable loudspeaker and initiating streaming audio file from the selected audio source to the network addressable loudspeaker.

6. The computer readable storage medium of claim 1, the method further comprising:
   detecting a close proximity between a wearable device and one or more network addressable loudspeakers;
   identifying a nearest network addressable loudspeaker;
   automatically selecting the nearest network addressable loudspeaker; and
   initiating streaming of the audio file from the selected audio source to the nearest network addressable loudspeaker.

7. The computer readable storage medium of claim 6, wherein the wearable device comprises a headset.

8. The computer readable storage medium of claim 1, wherein the second user selection is received from a user control device, and the method further comprising:
   identifying one or more network addressable loudspeakers having a matching LAN gateway as the user control device; and
   limiting the second user selection to the one or more network addressable loudspeakers having a matching LAN gateway.

9. The computer readable storage medium of claim 1, wherein the second user selection is received from a user control device, and the method further comprising:
   identifying one or more network addressable loudspeakers having a desired physical proximity to the user control device; and
   limiting the second user selection to the one or more network addressable loudspeakers having the desired physical proximity to the user control device.

* * * * *